(No Model.) 7 Sheets—Sheet 1.

F. ARAMBURU.
NAUTICAL MAGNETIC TRACER APPARATUS.

No. 437,169. Patented Sept. 23, 1890.

WITNESSES:

INVENTOR:
Fredk Aramburu
By A. P. Thayer
atty.

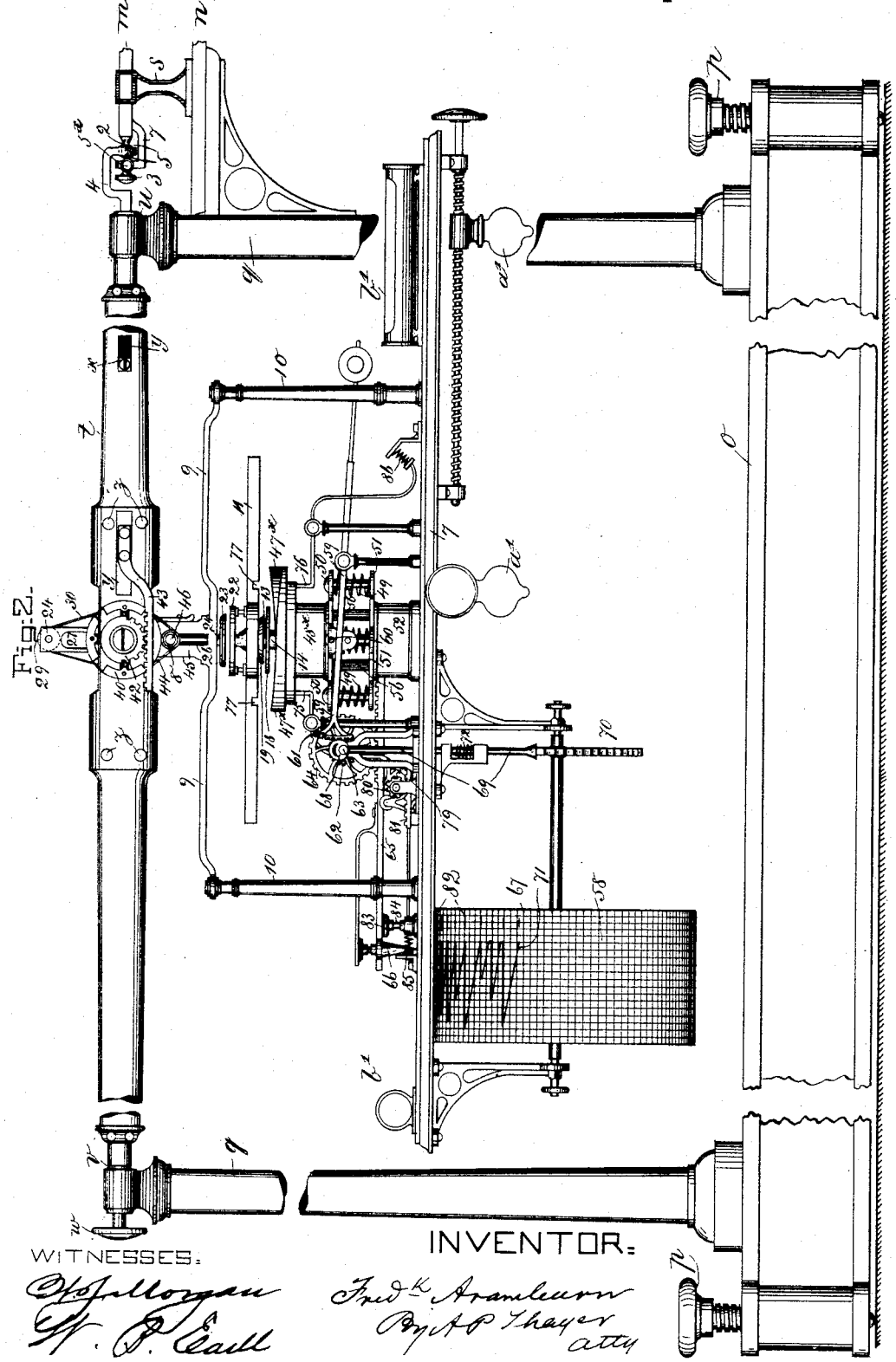

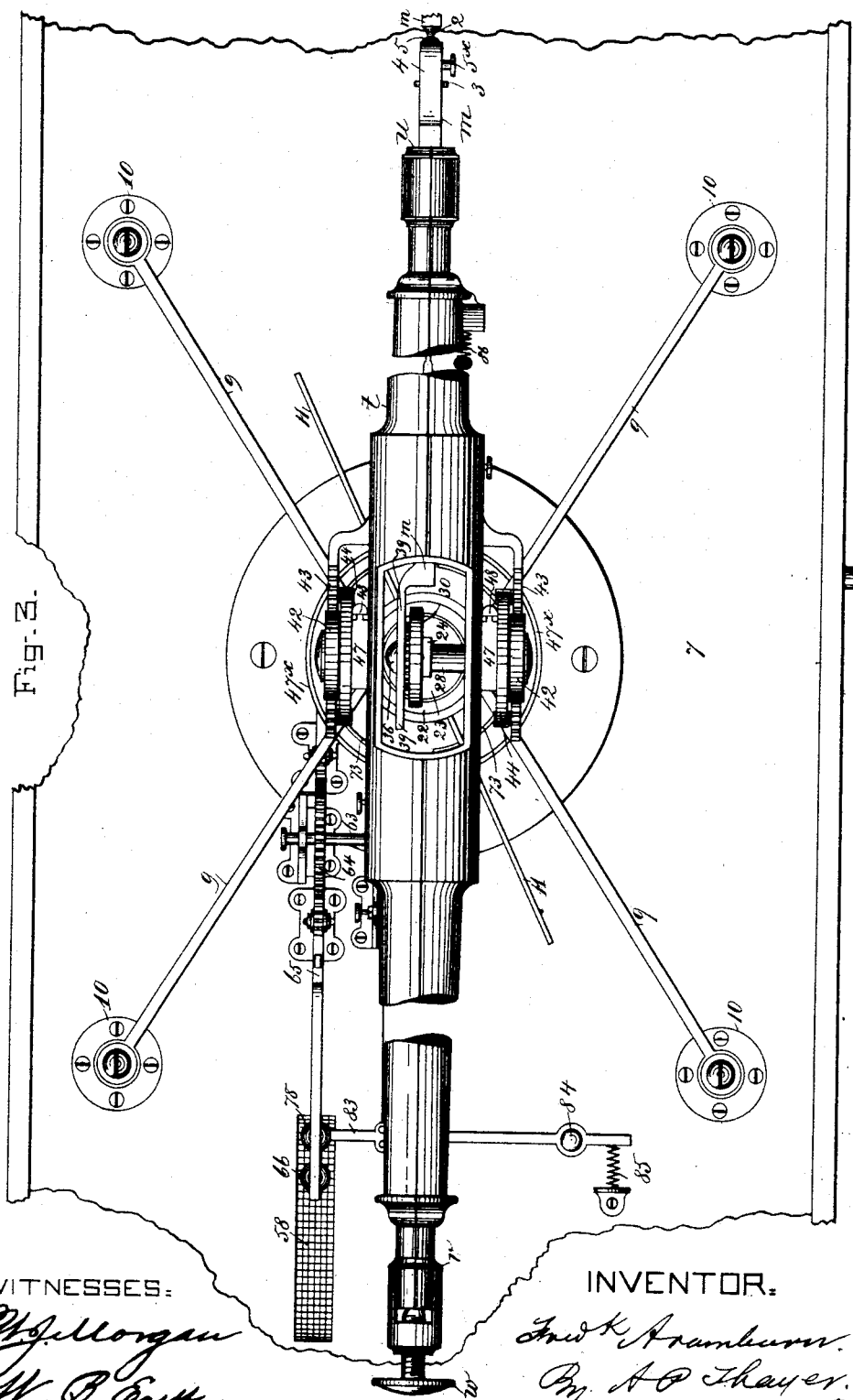

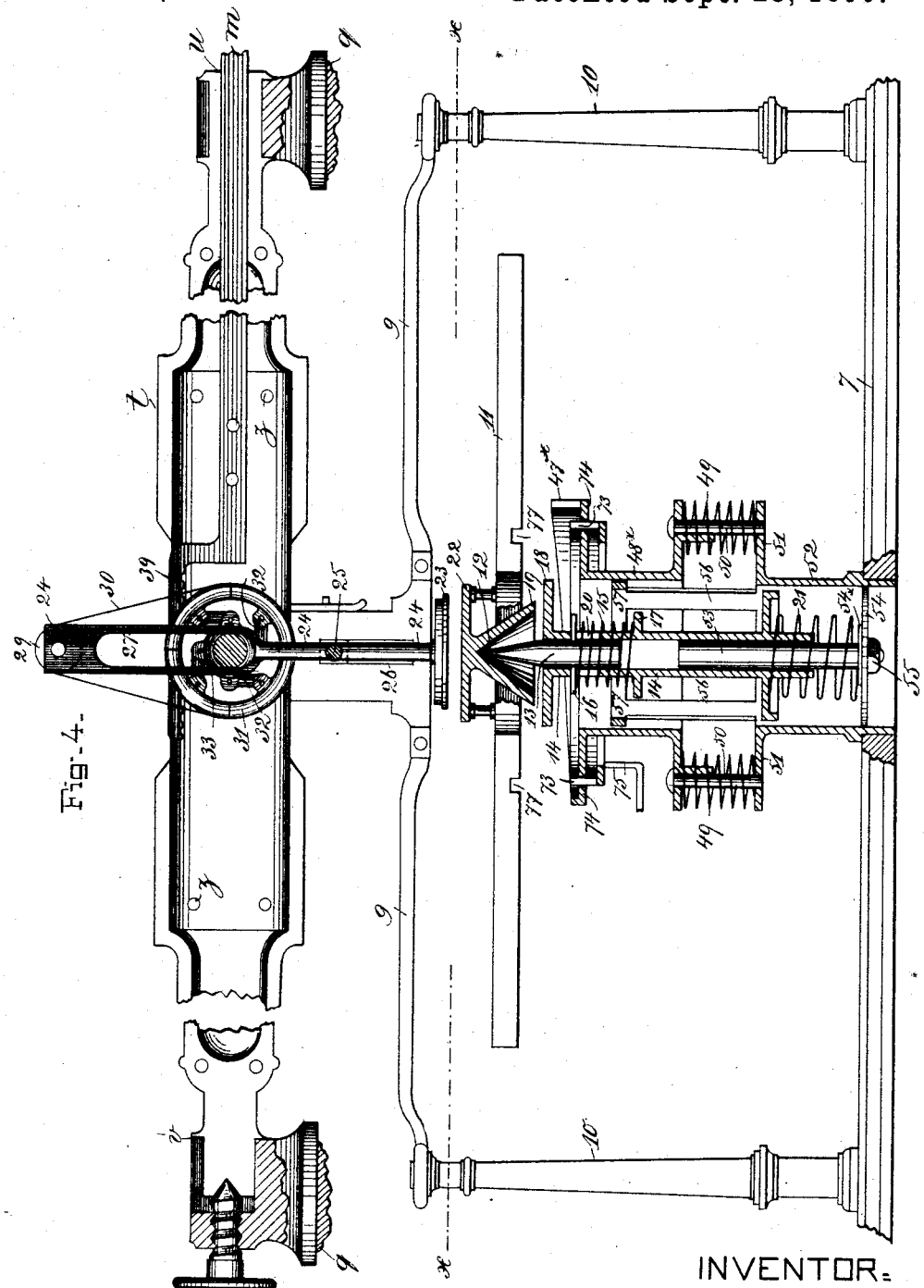

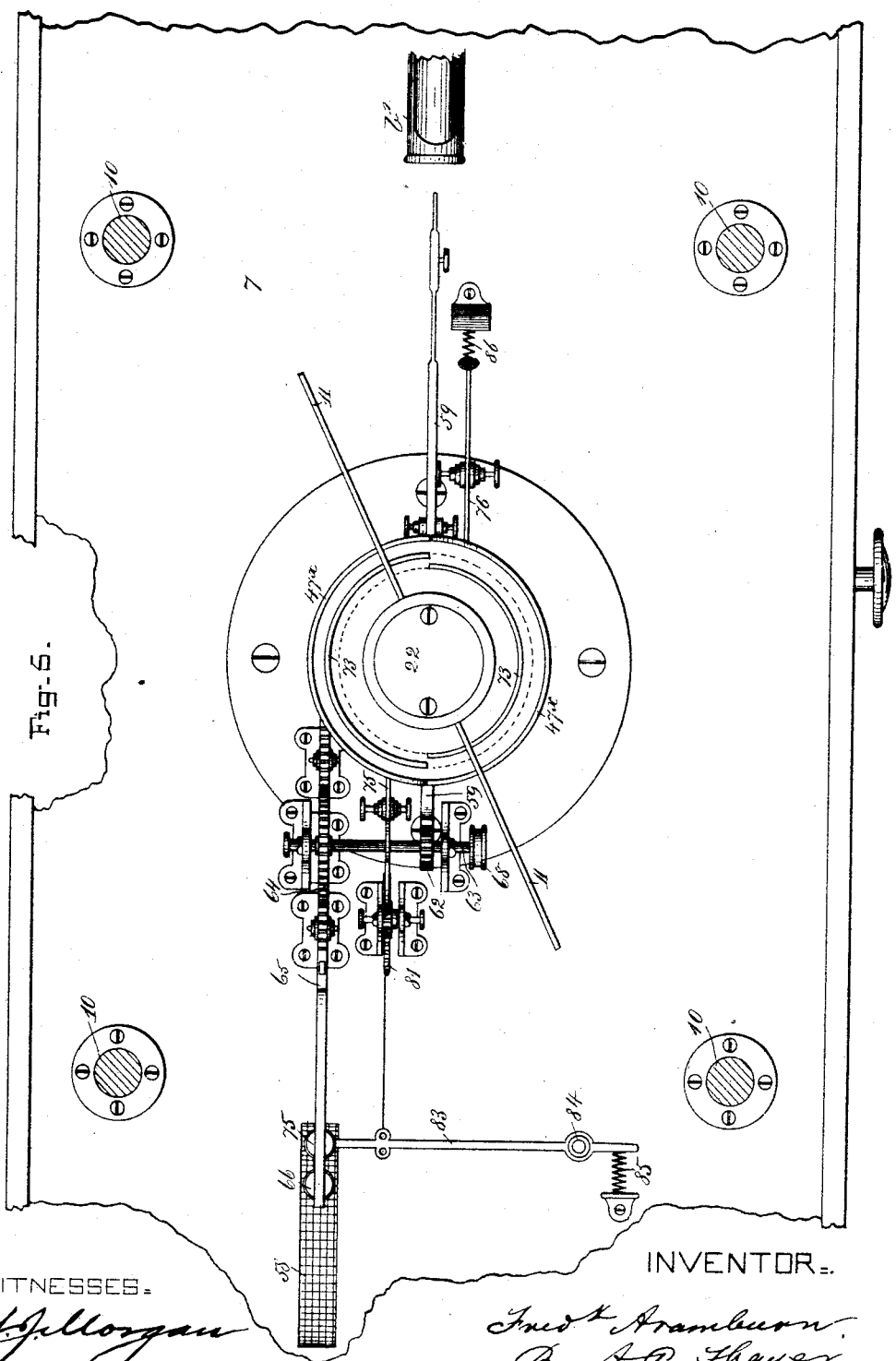

(No Model.) 7 Sheets—Sheet 6.
F. ARAMBURU.
NAUTICAL MAGNETIC TRACER APPARATUS.
No. 437,169. Patented Sept. 23, 1890.
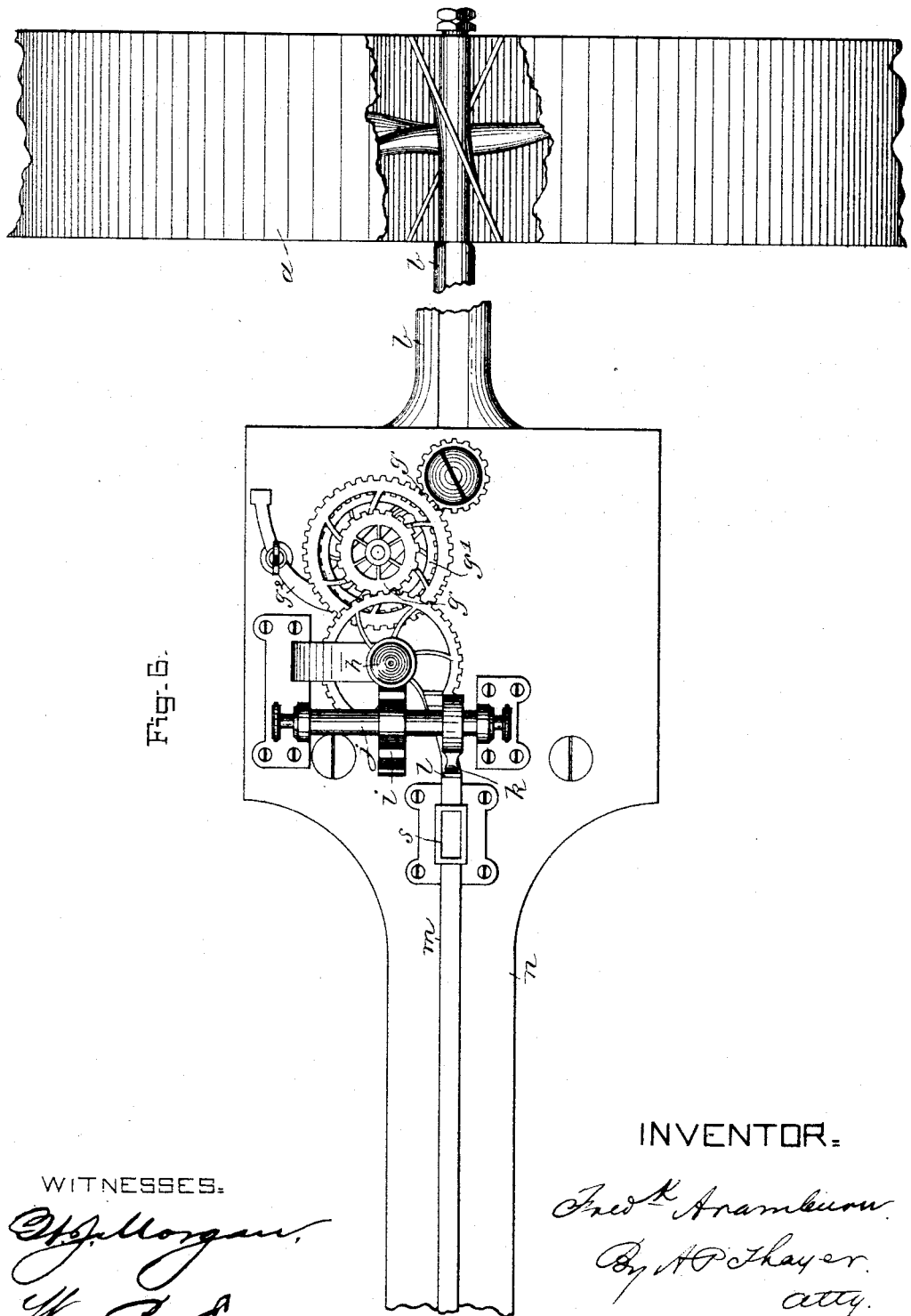
WITNESSES:
INVENTOR:

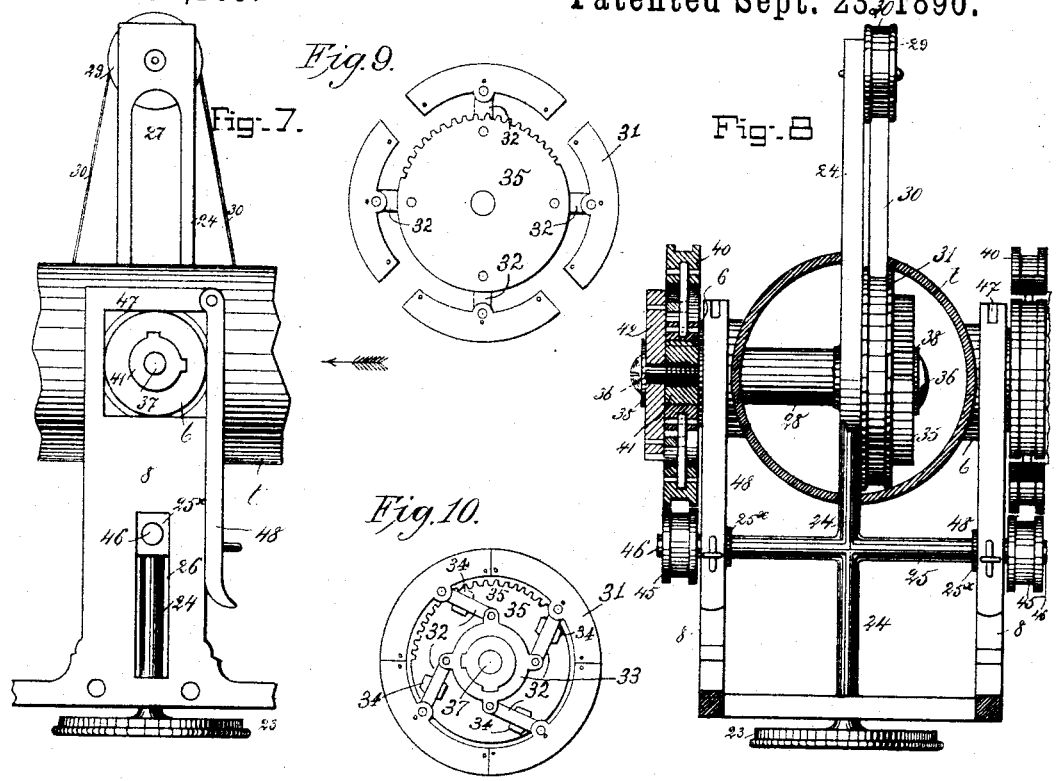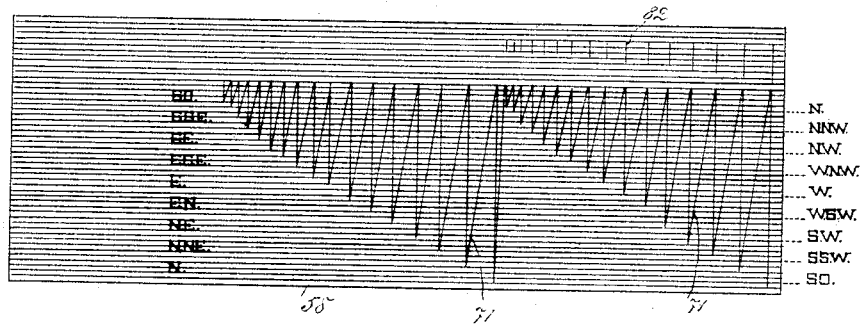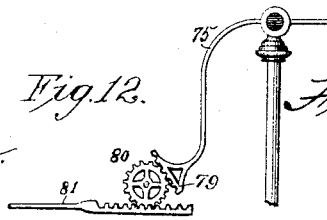

UNITED STATES PATENT OFFICE.

FREDERICK ARAMBURU, OF SEVILLE, SPAIN, ASSIGNOR TO RICARDO DOMINGUEZ, OF HAVANA, CUBA.

NAUTICAL MAGNETIC TRACER APPARATUS.

SPECIFICATION forming part of Letters Patent No. 437,169, dated September 23, 1890.

Application filed November 2, 1889. Serial No. 329,077. (No model.)

*To all whom it may concern:*

Be it known that I, FREDERICK ARAMBURU, a subject of the King of Spain, and a resident of Seville, Spain, have invented new and useful Improvements in Nautical Magnetic Tracer Apparatus, of which the following is a specification.

The object of the apparatus is to trace automatically upon a sheet of paper the courses and distances made by a ship on her voyage, more particularly for making surveys, but applicable for general use also.

The essential features of the invention consist of a small screw-propeller or motor-wheel suspended in the water from the ship, to be rotated by the water through which it is moved by the ship, and tracing mechanism which is actuated thereby, between which wheel and tracing mechanism a magnetic needle is interposed in such manner that the tracings vary according as the points of the compass vary to the needle, all as hereinafter fully described, reference being made to the accompanying drawings, in which—

Figure 1:
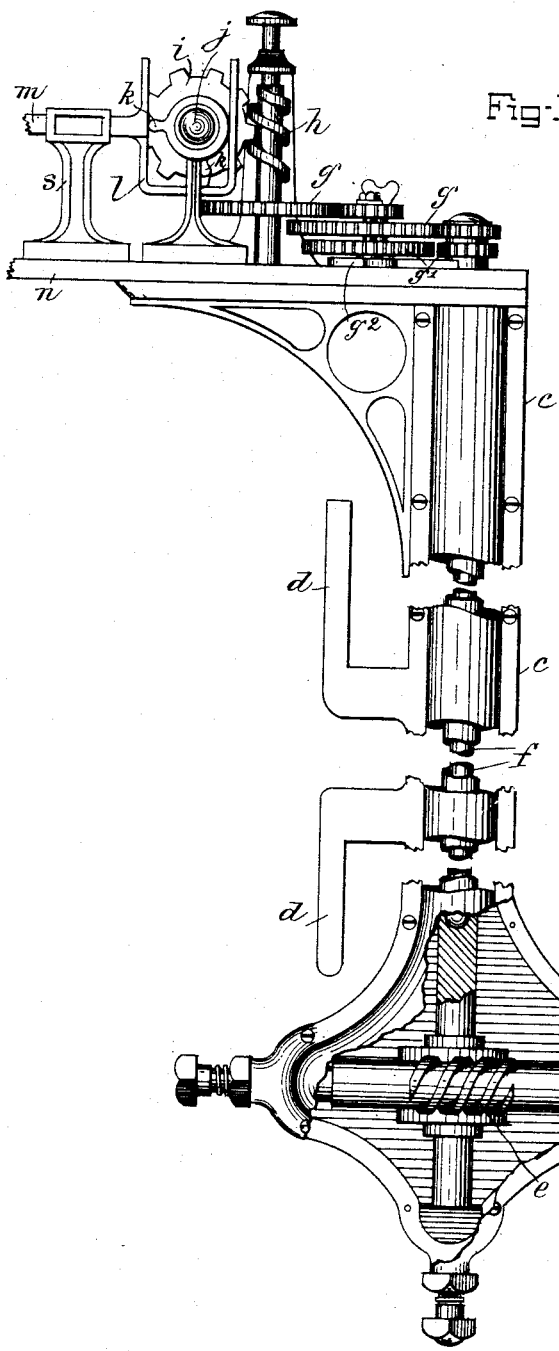
Figure 1:
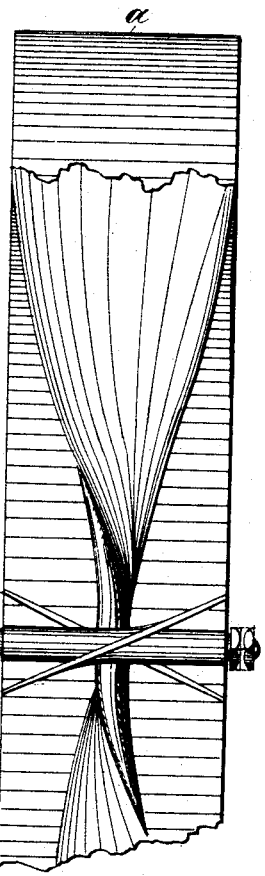

Figure 1 represents, partly in side elevation and partly in section, the wheel and suspending devices for obtaining the motion from the water, together with a reducing-train for graduating the motion and a device for converting the rotary motion of the wheel into reciprocating motion for actuating the needle, so as to cause it to rise and fall alternately and at intervals. Fig. 2 is a side elevation of the whole of the apparatus, except what is represented in Fig. 1, and a certain length of the connecting-bar, which it is to be understood is broken out for convenience of representation in the drawings. A portion of the ship's deck, on which the instrument is supposed to rest, is also indicated in section. Fig. 3 is a plan view of the apparatus represented in Fig. 2. Fig. 4 is a longitudinal section of the apparatus of Fig. 2, except the base and posts of the stand, and on an enlarged scale. Fig. 5 is a horizontal section of the apparatus of Fig. 4 on line $xx$. Fig. 6 is a plan view of the apparatus represented in Fig. 1. Fig. 7 is a detail of the upper center portion of Fig. 2 in side elevation and on a scale of about four times that of Fig. 2. Fig. 8 is an elevation of the parts represented in Fig. 7, as seen in the direction indicated by the arrow at Fig. 7. Fig. 9 is a side elevation of an expanding and contracting wheel and its toothed operating-disk used in effecting vertical movements of the needle, said wheel being expanded. Fig. 10 is an elevation of the same in reverse, the wheel being contracted. Fig. 11 is a diagram of a recording-card with a record of a supposed sailed course traced thereon. Fig. 12 is a detail of the recording apparatus.

The screw-wheel $a$ is mounted at the extremity of the bearing $b$, at the lower termination of the hanger $c$, suitably for being suspended from the bow of the ship to such depth that it will not be raised out of the water by the pitching of the ship, said hanger having brackets $d$ for connecting it with suitable outrigged bracket-supports to be understood as carried by the ship. The shaft of the wheel gears by a worm and wheel at $e$ with a shaft $f$, the motion of which is, say, one to ten of the wheel, and is at the upper end of the bracket transmitted by the reducing-train $g$, worm $h$, and worm-wheel $i$ to the short shaft $j$, carrying the tappets $k$, which, working in the yoke $l$, reciprocate the connecting-rod $m$ intermittingly. By this train and worm-gear the motion is again reduced so that the reciprocating-rod makes, say, one stroke to twenty revolutions of the wheel. From the number of the strokes of the connecting-rod, duly recorded, as hereinafter described, and the pitch of the wheel the distance made by the ship is ascertained, and the number of strokes in a given time give the speed of the ship.

The duplicates of the reducing-train (indicated at $g'$ in Fig. 1) and the shifting-lever $g^2$ (indicated in Fig. 6) are introduced merely to show that, if desired, the movements of the connecting-rod may be varied relatively to the wheel, which may be accomplished by such device by taking off the pinion of the train $g$ on the top of shaft $f$ and shifting lever $g^2$ so as to connect the wheels $g'$ of different sizes. This may of course be provided for by various different contrivances of the transmitting and reducing train. The wheels of the train may also be disconnected by the lever $g^2$, in case it may be desired to stop the rest of the apparatus while allowing the wheel to run.

From the top of the hanger $c$ a supporting-beam $n$ for the connecting-rod extends along over the deck to a stand $o$, located at any suitable position on the deck and having adjusting-screws $p$ in the base for leveling it when the ship floats on a level surface, the beam being supported near the upper end of one of the posts $q$ of the stand and supporting the connecting-rod at intervals on the standards $s$, in the upper ends of which the rod is fitted to slide in freely. Between the posts $q$ of the stand $o$ the hollow rocking-beam $t$ is mounted in line with the connecting-rod by the hollow journal $u$ at one end, through which the connecting-rod $m$ extends, and by the solid journal $v$, with which there is fitted the center screw $w$ to adjust the beam carefully to prevent slack motion. This rocking beam is divided vertically in two half-parts, and said parts are bolted together at $z$, and at the middle there is a wide vertical slot through it to facilitate the adjustment of the parts located within said tube. The connecting-rod extends to the middle of the hollow rock-beam, and is supported at intervals along it by the slide-lugs $x$, attached to it and resting in slideway-slots $y$ in the opposite sides of the hollow rock-beam. A little in advance of where the connecting-rod $m$ enters the hollow journal $u$ of the hollow rock-beam $t$ there is a coupling for allowing the part of the rod entering said rock-beam to oscillate with it, the rest of said rod being necessarily prevented from oscillation to prevent too much friction and to carry the yoke $l$ in its proper relation to the tappets. This joint consists of the yoke 1, carrying the fixed center 2 and the adjusting center screw 3, and the yoke 4, carrying the center sockets at 5, coinciding with the said centers 2 and 3 and with the axis of the rock-beam and allowing the beam and the part of the connecting-rod in it to turn freely while the connection of the two parts of the rod for reciprocation is suitably maintained.

The rock-beam carries a trunnion 6, projecting from each side at the center, from which the gravitating needle-carrying table 7 is suspended by the hangers 8, arms 9, and the hanger-columns 10, said table 7 being thus adapted for keeping its level, however the ship may pitch and roll, and it is provided with adjusting-weights $a'$ and spirit-levels $b'$, by which to adjust it when the ship is at rest suitably for carrying the magnetic needle 11, which is mounted on it under arms 9 and upon the point 12 of a rod 13, carried in the vertical tube 14, so as to slide up and down freely in said tube, with a delicate coiled spring 15, between the key 16, extending through the rod and a slot 20 of the tube and the collar 17 of the tube, to lift the rod and thereby raise the needle to the normal position and to yield when the needle is forced down, as will be explained farther on. Above the spring 15 and key 16 the tube 14 carries a disk 18, over which the needle carries the conical pendent hood 19, the purpose of which is to bear on disk 18 and force it and the tube 14 and its stronger supporting-spring 21 down when the lighter spring 15 and rod 13 have been first slightly depressed, the hood 19 and the disk 18 being to relieve the light spring 15 and the needle-supporting point of all pressure beyond the slight amount that is necessary for lifting and supporting the needle and hood 19 free of disk 18 in the normal position, this being necessary to protect the needle-supporting point of rod 13, which must be as delicate as possible, from any undue stress. The needle is to be thus forced down, for a purpose that will appear farther on, at each forward or left-hand movement of connecting-rod $m$ and allowed to rise again to the normal position on the back-stroke of said rod. This may of course be effected by various contrivances of apparatus, and while I represent herein the arrangement which I prefer I do not mean to be limited to a particular contrivance, as I believe myself to be the first to make use of the general principle of my invention for accomplishing the purposes of it.

The needle carries a broad disk platen 22 over its pivot-center, over which is a correspondingly-shaped presser-plate 23, which is made to rise and fall by the connecting-rod $m$ and in unison with its respective movements, and said presser forces the needle down, as above stated. This plate 23 is attached to the lower end of a rod 24, extending downward from a cross-head 25 under rock-beam $t$ and having slides $25^\times$ working in slideway-slots 26 in the hangers 8, by which the gravitating table 7 is suspended from the trunnions 6 of the hollow rock-beam $t$. From the cross-head 25 rod 24 extends upward through and to a suitable height above said rock-beam, said rod being suitably broadened and slotted, as at 27, above the cross-head to admit the fixed shaft 28 through its slot, and at the upper end it carries the pulley 29, from which the thin steel band 30 is suspended around the expanding and contracting sectional ring 31 on the shaft, said shaft being a fixed arm extending from the left-hand trunnion, Fig. 7, to and terminating a little beyond the center of the hollow rock-beam. This expanding ring consists of four segments, (more or less, as preferred,) each pivoted to the outer extremity of an arm 32, which is at its inner end pivoted to a hub 33, which is keyed fast to the fixed shaft at its inner extremity. Each arm of the ring is embraced by the forked studs 34, projecting from one side of a wheel 35, toothed on the face in part and mounted at the end of the shaft, and at one side of the extensible ring by the pivot-screw 36, screwed into a tapped hole, as 37, in the end of said shaft, with a washer 38 between the head of the pivot-screw and the side of the wheel 35.

This wheel is mounted with the toothed portion of its face uppermost, as seen in Fig. 8, and the toothed rack 39, Figs. 3 and 4, of connecting-rod m gears with it, the said rack and wheel and the extension-ring being so adjusted that when the connecting-rod m shifts to the left the ring contracts and when it shifts to the right the ring expands. (See Figs. 9 and 10.) The expansion of the ring 31 tightens the band 30 and forces the presser-plate 23 down, and the presser forces down the needle, and the contraction of the ring slackens the band and allows the presser-plate to be raised for releasing the needle and allowing it to rise to its normal position. To raise the presser-plate when ring 31 is thus contracted, other similar expanding and contracting rings 40 are used—one at each outer extremity 41 of the trunnions 6—whereon they are similarly keyed by their hubs 33 with other toothed wheels 42, for working them by other racks 43, carried by the connecting-rod m, these racks being located under their respective toothed wheels, while rack 39 is located over its toothed wheel, so that while ring 31 is expanded for forcing the presser-plate downward, rings 40 are contracted, and vice versa. The connection of rings 40 with the presser-plate is by similar metallic bands 44, extending around small pulleys 45, carried on the projecting extremities 46 of the cross-head 25. The hangers 8 are connected to the trunnions 6 by the yokes 47 and latches 48.

Under the needle are two opposite semicircular reversely-inclined upwardly-projecting flanges 47$^\times$ of the upper end of a hollow cylinder 48$^\times$, which is seated on springs 49, with guide-posts 50, for insuring accurate vertical movement. The posts are supported rigidly in the upper flange 51 of a hollow cylindrical base 52, attached to the gravitating table 7, in which base the guide-rod 53, on which the tube 14 and the spring 21 for lifting it are mounted on a supporting-bar 54. The rod 53 is firmly seated on said cross-bar by a base-flange 54$^\times$ and a tightening-nut 55 to hold the rod with the requisite stability for the proper support of the needle-carrying tube 14. From the upper end of base 52 standards 56 extend upward into hollow cylinder 48 and support therein a guide-ring 57 for an additional means of insuring accurate vertical movement of the reversely-inclined flanges 47$^\times$.

It will be seen that when the needle is forced down by the presser-plate 23 it will be made to press on these flanges 47$^\times$, and thereby force cylinder 48 down, and the extent of the downward movement will vary according as it is brought to bear on the higher or lower parts of the flanges, which turn under the needle according as the ship's course varies, the needle always keeping its station in the north and south line. The flanges always return to the same height, being limited by the heads of the guide-posts 50. The rise of the tube 14 by the spring 21 is limited only by the range of the spring 21, it being only necessary that the needle shall rise to a free position between flanges 47$^\times$ and presser 23. The hollow cylinder 48$^\times$, thus having variable strokes, according to the course of the ship, is made to record them on a card 58 by working the lever 59, with which it engages by the stud-pins 60, which lever is balanced for working easily and has the toothed segment 61, gearing with a pinion 62 on the shaft 63, carrying the toothed wheel 64, which gears with the sliding bar 65, carrying the marking-point 66, which bears on the card 58, wound on the drum 67, and made to turn slightly at the same time that the marking-point is shifted to the left by the downstroke of the said cylinder 48$^\times$, the turning of said drum being effected by the eccentric 68 on shaft 63, forcing pawl-slide 69 down on ratchet-wheel 70 on the shaft of drum 67, thus making the diagonal lines 71 on the card. The return movement of the cylinder 48$^\times$ raises lever 59, which causes the return movement of the marking-point to the position from which it started. The marking-point then makes the parallel lines intermediate to the diagonal lines. The drum and the card then being stationary, the coiled spring 72 raises the pawl-slide at the same time ready for the next operation. Thus it will be seen that supposing the apparatus to be so adjusted on the ship and with relation to the needle that when the ship is headed south the needle will cross said flanges 47$^\times$ at the lowest points and the inclines of the flanges are such that changing the course of the ship eastward the rising inclination of the flanges pass under the needle, then the lines made on the card will increase in length until the ship heads north, when the longest lines will be made. Then, if the same deviation of the course be continued—that is to say, from the north westward and around to the south again—another series of similar lines, ranging from shortest to longest, will be made, as in Fig. 11. It will however be noticed that the card thus marked will not distinguish by these two records the one made on the northern trend from that made on the southern. For this purpose a ring 73 is provided under the needle and preferably within the circle of the flanges 47$^\times$, said ring being made in two semicircular parts of different radii and carried by but also capable of rising and falling to some extent independently of the hollow cylinder 48$^\times$ and extending from above through and a suitable distance below the head 74, supporting flanges 47$^\times$, or at least some parts of it, and in such manner that it may have contact below said head with the lever 75 on one side and a balancing-lever 76 on the other side, and, together with this ring, the needle is provided with the notches 77, which are so adjusted relatively to the ring 73 that when the ship is on, say, the trend from south to north the notches coincide with and drop over the respective parts of the ring and take no effect on it; but on the other course, from north to south, when the two parts of the ring have changed positions relatively to the needle and its notches, the needle will then have contact with the ring and will push it down also, and the ring, acting on lever 75, and thereby on the marking-point 78, which it actuates through the segment 79, pinion 80, and rack 81, will make the record of short marks 82 on the card coincident with the principal record 71 made on that course, and thereby identifying it from the other.

The marking-point 78 is mounted on the vibrating arm 83, pivoted at 84 and having the spring 85 to return it to the starting-point. The lever 76 and spring 86 are simply to balance the resistance of lever 75 on the ring 73 and control it so as to work freely in the slot of head 74, in which it is carried. The means for producing the transverse motion of the marking-point and the shifting of the card-carrying drum through the instrumentality of the vertical movement of the needle may be varied at the will of the constructer, and I do not limit myself to the particular means herein represented.

I desire it to be understood that the flanges and ring on which the needle acts when forced down may be located over the needle and the device for causing the vertical movements of the needle may be reversed and the marking-point-actuating devices suitably arranged therewith for actuating said marking-points by the upward movement of the needle instead of the downward, and I consider this included in my invention and claims.

The card or paper strip on which the marking-point traverses diagonally is divided longitudinally into spaces by lines which may be considered as corresponding to the points of the compass, as noted in Fig. 11, and they show by their relations to the marks made by the marking-point the course of the vessel. The number of marks made on the card by the pointer tell the number of strokes of the reciprocating connecting-rod, and this is a basis for ascertaining the distance sailed by the number of turns and the pitch of the screw. The card is also ruled in squares to facilitate calculations.

When sailing in waters having a current either with or against the vessel, the proper allowance for the ascertained velocity of the current must be taken into account in determining the speed and distance.

The apparatus is to be made mostly of copper.

I claim as my invention—

1. The combination, with a poised magnetic needle having periodical vertical movements, of the reversely-inclined opposite semicircular flanges surrounding and turning about the vertical axis of the needle and vertically movable by the needle, a marking-point actuated thereby, and a movable card for receiving the record of the marking-point.

2. The combination, in a mariner's compass, of the needle having periodical vertical movements, the reversely-inclined opposite semicircular flanges surrounding and turning about the vertical axis of the needle and vertically movable by the needle, a marking-point actuated thereby, and a movable card for receiving the record of the marking-point, all suspended with the compass.

3. The combination, in a mariner's compass, of the needle having periodical vertical movements, the opposite semicircular reversely-inclined flanges surrounding and turning about the vertical axis of the needle and connective with the needle throughout the circuit of said flanges under the needle, the ring also surrounding and turning about the vertical axis of the needle and connective with the needle throughout part of its circuit thereunder, the marking-point actuated through the instrumentality of the connection of said needle and flanges, the marking-point actuated through the instrumentality of the ring, and the movable card for receiving the record of the marking-point.

4. The combination, in a mariner's compass, of the needle mounted on vertically-movable supports, the presser for actuating the needle, the motor-wheel suspended in the water from the ship, mechanism, substantially as described, connecting and actuating the presser by the wheel, and springs for reacting the needle, substantially as described.

5. The combination, in a mariner's compass, of the needle mounted on the gravitating table by vertically-movable supports, the presser for actuating the needle, the motor-wheel suspended in the water from the ship, mechanism, substantially as described, connecting and actuating the presser by the wheel, and springs for reacting the needle, substantially as described.

6. The combination, in a mariner's compass, of the needle mounted on the gravitating table by vertically-movable supports, the presser for actuating the needle, the motor-wheel suspended in the water from the ship, mechanism, substantially as described, connecting and actuating the presser by the wheel, springs for reacting the wheel, a marking-point actuated by the vertical movement of the needle, and a movable card for receiving the record of the marking-point.

7. The combination, in a mariner's compass, of the needle mounted on the gravitating table by vertically-movable supports, the presser for actuating the needle, the motor-wheel suspended in the water from the ship, mechanism, substantially as described, connecting and actuating the presser by the wheel, springs for reacting the needle, a marking-point actuated by the vertical movement of the needle, a secondary marking-point actuated by the needle during a predetermined course of the ship, but unaffected thereby during an opposite course, and a movable card to receive the records of the marking-points.

8. The combination of the presser and its carrying-rod mounted for vertical movements in the gravitating needle-support, the reversely expanding and contracting wheels and bands respectively connected with the presser-carrying rod above and below said wheels, the reciprocating rod actuating said expanding and contracting wheels, the motor-wheel suspended in the water from the ship and actuating said rod, and the oscillating joint in said rods.

9. The combination of the hollow oscillating beam, its trunnions, the gravitating hangers suspended from the trunnion, the internal transverse shaft of said beam, expanding and contracting wheel mounted on said shaft within the beam, the presser-carrying rod arranged vertically through the beam, the cross-head of said rod extending through slideways of the hanger, the expanding and contracting wheels mounted on the trunnions of the beam and connected by bands with pulleys on the extremities of the cross-head, and the reciprocating connecting-rod in the hollow beam and actuating the expanding and contracting wheels, the said expanding and contracting wheel within the hollow beam connected by its band with the upper end of the presser-rod, and being actuated reversely to the other said expanding and contracting wheels by the connecting-rod.

10. The combination of the needle, its vertically-movable support, the inclined and vertically-movable flanges under and surrounding the needle-support, the presser, and the springs reacting the needle and the flanges.

11. The combination of the needle, its vertically-movable support, the inclined and vertically-movable flanges, the ring movable with and also independently of the flanges, the presser, and the springs for reacting the needle, the flanges, and the ring.

12. The combination of the vertically-movable needle-supporting-point-carrying tube, the needle-supporting point vertically movable in said tube, the vertically-movable hollow cylinder carrying the inclined flanges and the ring, and the presser.

13. The combination of the vertical needle-carrying-point tube, the disk on the upper end of the same, the needle-carrying point vertically movable in said tube, the hood pendent from the needle, the disk on the needle above the supporting-point, and the presser-disk.

14. The combination of the vertically-movable reversely-inclined flanges, the ring of semicircular parts having different radii and vertically movable with and also independently of the flanges, and the vertically-movable needle having notches coincident and therefore inoperative on the ring when the vessel is on one course and varying therewith and rendering the needle operative on said ring when the vessel is on the opposite course.

15. The combination of the vertically-movable needle, the hollow cylinder vertically movable by the needle, the lever movable by the cylinder, and the marking-point movable by the lever.

16. The combination of the vertically-movable needle, the hollow cylinder vertically movable by the needle, the lever movable by the cylinder, and the marking-point and card-carrying device movable by said lever.

17. The combination of the vertically-movable hollow cylinder having the reversely-inclined flanges, the ring of semicircular parts having different radii and vertically movable with and also independently of the flanges, the vertically-movable needle having notches coinciding with and therefore inoperative on the ring when the vessel is on one course and varying therewith and rendering the needle operative on said ring when the vessel is on the opposite course, the lever operated by said cylinder and operating the primary marking-point, and the lever operated by the ring and operating the secondary marking-point.

18. The combination of the hollow cylinder having the reversely-inclined flanges, the ring operating the secondary marking-point and movable with and independently of said cylinder, the lever operating said secondary marking-point, and the balancing-lever counteracting the lateral thrust of the marking-point-operating lever.

In testimony that I claim the foregoing as my invention I have signed my name, in presence of two witnesses, this 18th day of September, 1889.

FREDERICK ARAMBURU.

Witnesses:
WILFRED B. EARLL,
W. J. MORGAN.